UNITED STATES PATENT OFFICE.

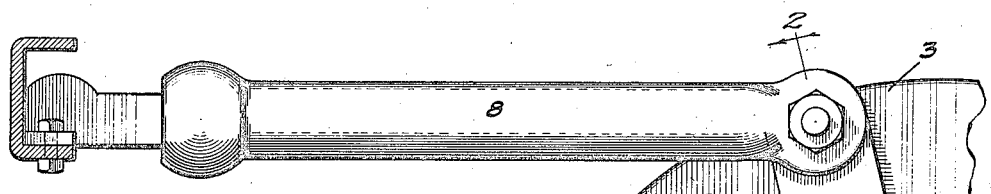
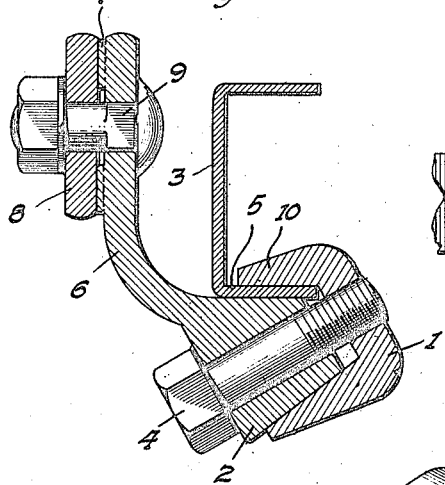
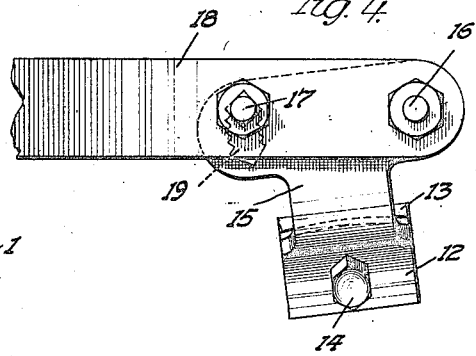
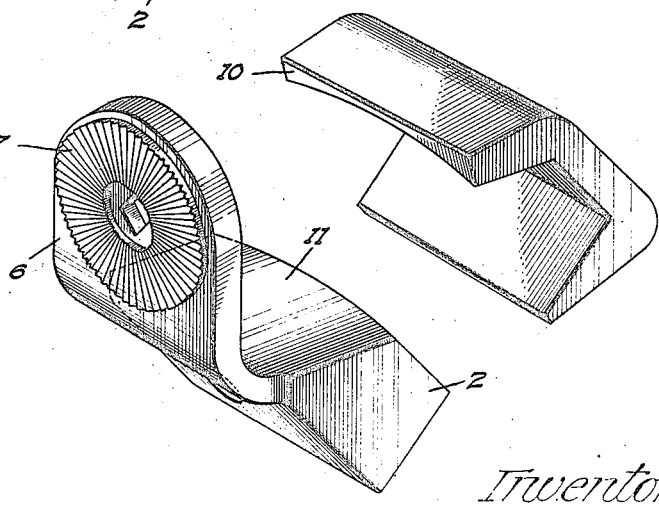

CHARLES H. HATHAWAY, OF WEST ALLIS, WISCONSIN, ASSIGNOR TO BADGER MANUFACTURING CORPORATION, OF MILWAUKEE, WISCONSIN, A CORPORATION OF DELAWARE.

CLAMP.

1,416,351. Specification of Letters Patent. Patented May 16, 1922.

Application filed January 20, 1921. Serial No. 438,686.

*To all whom it may concern:*

Be it known that I, CHARLES H. HATHAWAY, a citizen of the United States, residing at West Allis, in the county of Milwaukee and State of Wisconsin, have invented new and useful Improvements in Clamps, of which the following is a specification.

This invention relates to clamps or attachers.

It is particularly adapted to fasten an automobile bumper bracket to the side bar of an automobile frame, but may be used for other purposes.

The side bar of an automobile chassis ordinarily has a web with an upper and a lower inwardly projecting lateral flange. The automobile fenders ordinarily are fastened to the upper flanges of the side bars and project upwardly and outwardly therefrom. The splash apron extending between the side bars on some automobiles, frequently is fastened to the upper flanges.

It has been proposed to fasten the bumper bracket to the side bar by means of clamps or attachers which extend through either the splash apron or the fender.

These attachers fail to serve satisfactorily the purpose because they are difficult to fasten to the side bars and further because of the necessity of mutilating either the splash pan or the fender.

It, therefore, is desirable that the attacher be fastened near the end of the side bar and arranged to engage and be supported by the lower flange thereof.

According to this invention, the attacher comprises a pair of clamping members or jaws arranged to engage and grip the lower flange of the side bar therebetween.

One of the objects of this invention is to provide an attacher which when fastened to an automobile side bar flange exerts a wedging action thereon.

Another object is to provide an attacher which is efficient and positive.

Another object is to provide an improved attacher which may be readily fastened to the automobile chassis and which may be readily and economically manufactured.

Another object is to provide a pair of clamping members which are held in clamping engagement with a side bar flange by a retainer mounted at an oblique angle with respect to the side bar flange.

Another object is to provide an attacher wherein one of the clamping members is so arranged that the bumper bracket attached thereto may be adjusted independently of the member holding the clamping members in clamping relation to the side bar flange.

Other objects and advantages will hereinafter appear.

The views of the drawings are:

Figure 1 is a side elevation of a clamp or attacher fastened to the side bar of an automobile chassis, and supporting a bumper bracket.

Figure 2 is a cross-section on line 2—2 of Figure 1.

Figure 3 is a perspective of the inner and outer clamping members of the attacher in position to be assembled.

Figure 4 shows an alternative form of clamp.

Figures 1 to 3 will first be described.

The attacher or clamp comprises an outer clamping member 1, and an inner clamping member 2, which may be held in clamping engagement with the lower flange of the side bar 3 of an automobile frame by means of a holding member 4. This holding member may take the form of a bolt whose shank extends through the clamping member 2, having threaded engagement with the outer clamping member 1.

The clamping member 1 may take the form of a U-shaped bracket or channel bar with one of the flanges or jaws thereof curved the fit the upper face of a lower laterally extending flange 5 of the chassis side bar. The other flange or jaw of the clamping member 1 may be flat to receive the lower flat side of the clamping member 2. Obviously, the jaws of the clamping member 1 may assume other forms.

The inner clamping member 2 consists of a substantially solid wedge-shaped block adapted to engage the lower side of the flange 5 and fit into the U-shaped member 1. The upper surface 11 of the member 2 is curved lengthwise to approximate the curvature of the lower face of the flange 5 of the downwardly extending side bar 3, but obviously may be straight to fit other portions of the flange.

Thus the shapes of the clamping members 1 and 2 may be such as to conform to and readily fit the sides of the flange 5.

When the inner clamping member 2 and outer clamping member 1 are drawn together by tightening the bolt 4 there is a wedging action between the clamping members 1 and 2 and the flange 5, whereby the attacher is firmly and securely held.

The clamping member 2 has an outwardly and upwardly extending bracket arm 6 provided with an outer serrated or corrugated face 7 arranged to cooperate with a similar serrated face provided at the rear end of the bumper bracket 8. Thus the bumper bracket 8 may be adjusted to different positions on the bracket arm 6 and held in such adjusted position through the cooperation of the engaged serrated faces, and a holding bolt 9 passing through coinciding apertures therein.

When fastening the automobile bumper bracket to the side bar of an automobile frame, the outer clamping member 1 is positioned on the lower flange thereof with the projection 10 resting thereon. The inner clamping member 2 is then positioned with the aperture therein registering with the threaded aperture in the outer clamping member 1. The bolt 4 may then be inserted through the opening in member 2 and threaded into the member 1 to draw the clamping members securely into engagement with the flange 5 (as shown in Figure 2). The attacher then grips the side bar with the projection 10 of the outer clamping member resting upon the lower flange of the side bar and supporting the parts of the attacher.

Fig. 4 will now be described.

The clamp comprises two members 12 and 13 which are held in clamping engagement with a side bar flange of an automobile by means of a bolt 14.

The member 12 has an outwardly and upwardly extending bracket arm 15 with openings therein through which bolts 16 and 17 may be inserted for attaching a bumper bracket arm 18 thereto. The opening 19 is elongated and is provided with serrated edges to receive a square shoulder of the carriage bolt 17. Thus by loosening the nuts on the bolts 16 and 17, the bracket arm 18 may be adjusted to different positions and heights.

Obviously the invention contained herein is susceptible of various changes and adaptations.

The invention claimed is:

1. A clamp for fastening an automobile bumper bracket to the side bar of an automobile frame, comprising a U-shaped clamping member having diverging legs and adapted to embrace the lower side bar flange with one leg resting thereon, a wedge-shaped clamping member interposed between the flange and the lower leg of the U-shaped clamping member, an arm integral with the wedge shaped clamping member and provided with means for fastening the bumper bracket thereto, and a bolt extending through the wedge and having threaded engagement with the U-shaped clamping member.

2. A clamp for gripping the flange of an automobile side bar and for fastening thereto an automobile bumper bracket, having, in combination, a pair of clamping members one of which is adapted to rest upon the upper face of the side bar flange and the other to engage the lower face thereof, and a member for holding the clamping members in wedging engagement with the flange and extending through both clamping members, the axis of said member being oblique to the plane of the flange so that said member produces a direct binding action on the flange.

3. A clamp for fastening an automobile bumper bracket to the side bar of an automobile frame comprising a pair of clamping members one of which is adapted to rest upon the upper face of the side bar flange and the other to engage the lower face thereof, a bolt extending through one of the clamping members and having threaded engagement with the other, and a vertically disposed arm integral with the lower clamping member and provided with means for attaching the bumper bracket thereto.

4. An attacher for fastening an automobile bumper bracket to a side bar flange of an automobile chassis, comprising a pair of clamping members, one adapted to engage the upper face of the flange, the other being wedge-shaped and adapted to engage the lower face thereof, and a bolt extending through one of the members and having threaded engagement with the other member for causing the members to exert a wedging action upon the flange.

5. An attacher for fastening an automobile bumper bracket to a side bar flange of an automobile frame, comprising a pair of clamping members, one adapted to receive the other and to grip the flange therebetween, a member for holding the clamping members in clamping relation to the flange, an arm integral with one of the clamping members and provided with means for fastening the bumper bracket thereto, and means carried by the arm for adjusting the angular position of the bumper bracket with respect thereto.

6. An attacher for fastening an automobile bumper bracket to a side bar flange of an automobile chassis comprising a pair of clamping bars, one of which is channel shaped and adapted to receive the other and grip the flange therebetween, a member extending through the clamping members and arranged to hold the same in clamping relation to the flange, a vertically disposed arm integral with one of the clamping members, means for pivotally fastening the bumper bracket to the arm, and means adapted to extend through the bumper bracket and the arm and to lock the former in adjusted angular positon with respect to the latter.

7. An attacher for fastening an automobile bumper bracket to a side bar flange of an automobile chassis, comprising a pair of clamping members, one of the members having a curved jaw conforming to the curvature of the flange and adapted to receive the other member and grip the flange therebetween, means for holding the clamping members in clamping relation to the flange, an arm integral with one of the clamping members and provided with means for fastening the bumper bracket thereto, and means carried by the arm for adjusting the angular position of the bumper bracket with respect thereto.

8. A three part clamp for attaching a bumper bracket to an automobile side bar having in combination a channeled clamping member one arm of which is adapted to overlie and rest upon the upper face of the lower side bar flange, a wedge clamping member adapted to be interposed between the lower side bar flange and the other arm of the channeled clamping member, an arm integral with one of the clamping members and provided with means for fastening the bumper bracket thereto, and a bolt for causing the clamping members to wedgingly grip the side bar flange.

9. A three part clamp for attaching a bumper bracket to an automobile side bar having in combination a channeled clamping member, one arm of which is curved to conform approximately to the curvature of the flange and adapted to overlie and rest upon the upper face of the lower side bar flange, a wedge clamping member to which the bumper bracket may be directly fastened adapted to be interposed between the lower side bar flange and the other arm of the channeled clamping member, and a bolt extending through the clamping members on an axis oblique to the plane of the side bar flange so as to cause said clamping members to exert a direct binding action on the flange.

In witness whereof, I have hereunto subscribed my name.

CHARLES H. HATHAWAY.